United States Patent
Cao Minh (10) Patent No.: US 9,791,584 B2
(45) Date of Patent: Oct. 17, 2017

(54) DETERMINING PETROPHYSICAL PROPERTIES USING SODIUM NUCLEAR MAGNETIC RESONANCE (NMR) LOGS

(71) Applicant: Schlumberger Technology Corporation, Sugar Land, TX (US)

(72) Inventor: Chanh Cao Minh, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 388 days.

(21) Appl. No.: 14/276,706

(22) Filed: May 13, 2014

(65) Prior Publication Data

US 2014/0341455 A1    Nov. 20, 2014

Related U.S. Application Data

(60) Provisional application No. 61/823,104, filed on May 14, 2013.

(51) Int. Cl.
   *G06K 9/00*   (2006.01)
   *G01V 3/14*   (2006.01)
   *G01V 3/32*   (2006.01)

(52) U.S. Cl.
   CPC . *G01V 3/14* (2013.01); *G01V 3/32* (2013.01)

(58) Field of Classification Search
   None
   See application file for complete search history.

(56) References Cited

U.S. PATENT DOCUMENTS

| 5,629,623 | A | 5/1997 | Sezginer et al. |
| 6,111,409 | A | 8/2000 | Edwards et al. |
| 6,307,372 | B1 * | 10/2001 | Sugarman ............. G01R 33/44 |
| | | | 324/321 |
| 7,741,841 | B2 * | 6/2010 | Edwards ................. G01V 3/32 |
| | | | 324/303 |

(Continued)

OTHER PUBLICATIONS

L. Rijniers, L. Pel, H.P. Huinink, K. Kopinga, "Pore size distribution from hydrogen and sodium NMR using the transverse relaxation at 4.7 T," Magnetic Resonance Imaging, vol. 19, Issues 3-4, Apr.-May 2001, p. 580.

(Continued)

*Primary Examiner* — Nancy Bitar (57) ABSTRACT

The presence of hydrocarbons in a subsurface formation fluid may be inferred from a determined salt concentration. A sodium nuclear magnetic resonance (NMR) measurement of a subsurface formation is obtained and a salt concentration of the fluid in the subsurface formation is determined from the sodium NMR measurement. Various operations may be performed using the determined salt concentration such as tracking injected water, monitoring flood fronts, improving reserves estimation, and designing enhanced oil recovery. A sodium index may be determined and used in conjunction with one or more other logs to determine a saturation of the subsurface formation. The one or more other logs may include a resistivity log, a dielectric log, a capture cross section (sigma) log, and a proton NMR log. Differentiation between bound water and free water can also be achieved using the sodium nuclear magnetic resonance measurement.

5 Claims, 5 Drawing Sheets

(56) References Cited

U.S. PATENT DOCUMENTS

| | | | |
|---|---|---|---|
| 8,115,481 B2* | 2/2012 | Chen | G01N 24/081 |
| | | | 324/303 |
| 8,301,381 B2 | 10/2012 | Montaron | |
| 8,692,547 B2* | 4/2014 | Chen | G01V 3/32 |
| | | | 324/300 |
| 9,133,709 B2* | 9/2015 | Huh | E21B 47/1015 |
| 2003/0006768 A1 | 1/2003 | Kleinberg et al. | |
| 2005/0104587 A1 | 5/2005 | Akkurt | |
| 2009/0167302 A1 | 7/2009 | Edwards et al. | |
| 2009/0179636 A1* | 7/2009 | Chen | G01N 24/081 |
| | | | 324/303 |
| 2010/0264915 A1* | 10/2010 | Saldungaray | E21B 43/16 |
| | | | 324/303 |

OTHER PUBLICATIONS

Cao Minh et al. "Combining Resistivity and Capture Sigma Logs for Formation Evaluation in Unknown Water Salinity: A Case Study in a Mature Carbonate Field," SPE 135160-PA, SPE Reservoir Evaluation and Engineering Journal, Aug. 2011.

International Search Report and Written Opinion issued in International Application PCT/US2014/037975 dated Sep. 2, 2014. 15 pages.

International Preliminary Report on Patentability issued in International Application PCT/US2014/037975 dated Nov. 26, 2015. 12 pages.

European Supplementary Search Report issued in European Application 14798636.8 dated Nov. 7, 2016. 3 pages.

Tutunjian et al., Nuclear Magnetic Resonance Imaging of Sodium-23 Cores. Log Anlayst, vol. 34, No. 03, May 1, 1993. pages 11-19.

Examination Report 94(3) EPC issued in European Application 14798636.8 on Mar. 20, 2017. 7 pages.

* cited by examiner

(PRIOR ART)

DETERMINING PETROPHYSICAL PROPERTIES USING SODIUM NUCLEAR MAGNETIC RESONANCE (NMR) LOGS

CROSS-REFERENCE TO RELATED APPLICATIONS

The present application claims the benefit of related U.S. Provisional Patent Application Ser. No. 61/823,104, filed on May 14, 2013, entitled "Determining Petrophysical Properties Using Sodium Nuclear Magnetic Resonance (NMR) Logs," the disclosure of which is incorporated by reference herein in its entirety.

BACKGROUND OF THE DISCLOSURE

This section is intended to introduce the reader to various aspects of art that may be related to various aspects of the subject matter described and/or claimed below. This discussion is believed to be helpful in providing the reader with background information to facilitate a better understanding of the various aspects of the present disclosure. Accordingly, it should be understood that these statements are to be read in this light, not as admissions of prior art.

The present disclosure relates generally to using nuclear magnetic resonance tools to determine the presence of hydrocarbons in a subsurface formation. More specifically, the present disclosures relates to techniques for determining the presence of hydrocarbons using sodium nuclear magnetic resonance measurements.

Nuclear magnetic resonance (NMR) tools used for well-logging or downhole fluid characterization measure the response of nuclear spins in formation fluids to applied magnetic fields. Downhole NMR tools typically have a permanent magnet that produces a static magnetic field at a desired test location (e.g., where the fluid is located). The static magnetic field produces a magnetization in the fluid. The magnetization is aligned along the direction of the static field. The magnitude of the induced magnetization is proportional to the magnitude of the static field. A transmitter antenna produces a time-dependent radio frequency magnetic field that has a component perpendicular to the direction of the static field. The NMR resonance condition is satisfied when the radio frequency is equal to the Larmor frequency, which is proportional to the magnitude of the static magnetic field. The radio frequency magnetic field produces a torque on the magnetization vector that causes it to rotate about the axis of the applied radio frequency field. The rotation results in the magnetization vector developing a component perpendicular to the direction of the static magnetic field, thereby causing the magnetization vector to precess around the static field at the Larmor frequency. At resonance between the Larmor and transmitter frequencies, the magnetization is tipped to the transverse plane (i.e., a plane normal to static magnetic field vector). A series of radio frequency pulses are applied to generate spin echoes that are measured with the antenna.

NMR measurements can be used to estimate, among other things, formation porosity. For example, the area under the curve of a T2 distribution for a NMR measurement can be equated to or at least provides an estimate of the NMR-based porosity. The T2 distribution may also resemble the pore size distribution in water-saturated rocks. The raw reported porosity is provided by the ratio of the initial amplitude of the raw decay and the tool response in a water tank. This porosity is independent of the lithology of the rock matrix.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to using sodium nuclear magnetic resonance measurements to determine petrophysical properties in a subsurface formation. For example, the presence of hydrocarbons in a subsurface formation fluid may be inferred from a determined salt concentration. A sodium nuclear magnetic resonance (NMR) measurement of a subsurface formation is obtained and a salt concentration of the fluid in the subsurface formation is determined from the sodium NMR measurement. Various operations may be performed using the determined salt concentration such as tracking injected water, monitoring flood fronts, improving reserves estimation, and designing enhanced oil recovery. A sodium index may be determined and used in conjunction with one or more other logs to determine a saturation of the subsurface formation. Such additional logs may include a resistivity log, a dielectric log, a capture cross section (sigma) log, and a proton NMR log. One may also differentiate between bound water and free water using the sodium nuclear magnetic resonance measurement.

In accordance with one aspect of the present disclosure, a method includes determining a salt concentration of fluid in the subsurface formation using a sodium nuclear magnetic resonance (NMR) measurement obtained from a subsurface formation, and determining the presence of hydrocarbons in the subsurface formation fluid based on the determined salt concentration.

In accordance with another aspect of the present disclosure, a computing system having a processor, a memory, and a program stored in the memory is provided. The program includes instructions, which when executed by the processor, perform the following: obtaining a sodium nuclear magnetic resonance (NMR) measurement of a subsurface formation, determining a salt concentration of fluid in the subsurface formation using the sodium NMR measurement, and determining the presence of hydrocarbons in the subsurface formation fluid based on the determined salt concentration.

In accordance with yet another aspect of the present disclosure, a non-transitory, computer-readable storage medium, includes instructions, which when executed by a processor, cause the processor to perform the following: obtaining a sodium nuclear magnetic resonance (NMR) measurement of a body, determining a salt concentration of fluid in the body using the sodium NMR measurement, and determining the presence of hydrocarbons in the fluid based on the determined salt concentration.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

The present disclosure will be understood from the following detailed description when read with the accompanying figures.

DETAILED DESCRIPTION

One or more specific embodiments of the present disclosure are described below. These embodiments are only examples of the presently disclosed techniques. Additionally, in an effort to provide a concise description of these embodiments, all features of an actual implementation may not be described in the specification. It should be appreciated that in the development of any such implementation, as in any engineering or design project, numerous implementation-specific decisions are made to achieve the developers' specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. The embodiments discussed below are intended to be examples that are illustrative in nature and should not be construed to mean that the specific embodiments described herein are necessarily preferential in nature. It will also be understood that the term "and/or" as used herein refers to and encompasses any and all possible combinations of one or more of the associated listed items. Additionally, it should be understood that references to "one embodiment" or "an embodiment" within the present disclosure are not to be interpreted as excluding the existence of additional embodiments that also incorporate the recited features.

In addition, the present disclosure may repeat reference numerals and/or lettering in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As will be discussed below, aspects of the present disclosure relate to techniques for using sodium nuclear magnetic resonance (NMR) measurements to determine, among other things, the presence (or absence) of hydrocarbons in a subsurface earth formation. For example, using sodium NMR measurements, a salt concentration of the fluid in the subsurface formation can be determined. Various operations may be performed using the determined salt concentration such as tracking injected water, monitoring flood fronts, improving reserves estimation, and designing enhanced oil recovery. A sodium index may also be determined and used in conjunction with one or more other logs to determine a saturation of the subsurface formation. Such other logs may include resistivity, dielectric, capture cross section (sigma), and proton NMR logs. The presently disclosed techniques may also provide for differentiating between bound water and free water using the sodium NMR measurements.

Figure 1:
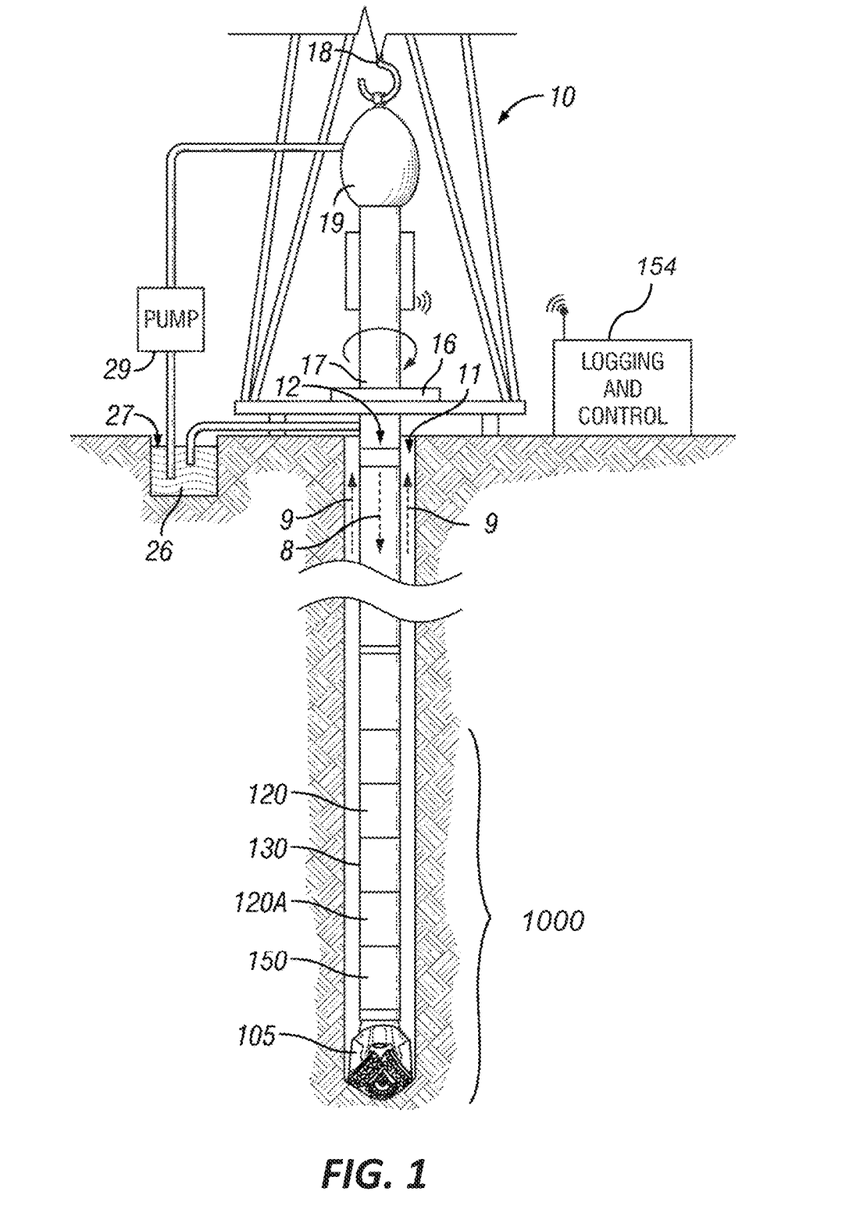
FIG. 1 illustrates an example of a well site system usable with embodiments of the present disclosure.

FIG. 1 illustrates a well site system in which various embodiments can be employed. The well site can be onshore or offshore. In this example system, a borehole 11 is formed in a subsurface formation by rotary drilling in a manner that is well known to those skilled in the art. Some embodiments can also use directional drilling techniques.

As shown in FIG. 1, a drill string 12 is suspended within the borehole 11 and has a bottom hole assembly (BHA) 1000 which includes a drill bit 105 at its lower end. The surface system includes platform and derrick assembly 10 positioned over the borehole 11, with the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from the hook 18, attached to a traveling block (also not shown), through the kelly 17 and a rotary swivel 19 which permits rotation of the drill string relative to the hook 18. As is appreciated by those skilled in the art, a top drive system could alternatively be used.

In the illustrated embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this manner, the drilling fluid lubricates the drill bit 105 and carries formation cuttings up to the surface as it is returned to the pit 27 for recirculation.

The bottom hole assembly 1000 of the illustrated embodiment includes a logging-while-drilling (LWD) module 120, a measuring-while-drilling (MWD) module 130, a rotary-steerable system (RSS) and motor 150, and drill bit 105.

The LWD module 120 is housed in a suitably configured type of drill collar, as is known in the art, and can contain one or multiple types of logging tools. It will also be understood that more than one LWD and/or MWD module can be employed, e.g., as represented at 120A. Accordingly, it is understood that references throughout the present disclosure to a module at the position of 120 can alternatively mean a module at the position of 120A as well. The LWD module 120 includes capabilities for measuring, processing, and storing information, as well as for communicating with surface equipment. In the present embodiment, the LWD module 120 includes a nuclear magnetic resonance measuring device capable of obtaining sodium NMR measurements, as will be discussed further below.

The MWD module 130 is also housed in a suitably configured type of drill collar, as is known in the art, and can contain one or more devices for measuring characteristics of the drill string and drill bit 105. The MWD tool 130 further includes an apparatus (not shown) for generating electrical power to the downhole system. This may typically include a mud turbine generator powered by the flow of the drilling fluid, it being understood that other types of power and/or battery systems may also be employed. In the present embodiment, the MWD module can include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a D&I package).

The operation of the assembly 10 of FIG. 1 may be controlled using the logging and control system 154, which may include one or more processor-based computing systems. In the present context, a processor may include a processing device capable of executing encoded instructions stored, for example, on tangible computer-readable media (e.g., read-only memory, random access memory, a hard drive, optical disk, flash memory, etc.). Such instructions may correspond to, for instance, workflows and the like for carrying out a drilling operation, algorithms and routines for performing various inversions using acquired logging data (e.g., for determining formation models), and so forth. In particular, instructions executed by a processor in accordance with the present disclosure may include instructions corresponding to determination of petrophysical properties of a subsurface formation using sodium NMR logs. Additional details of a processor-based computing system are discussed below with reference to FIG. 3.

Figure 2:
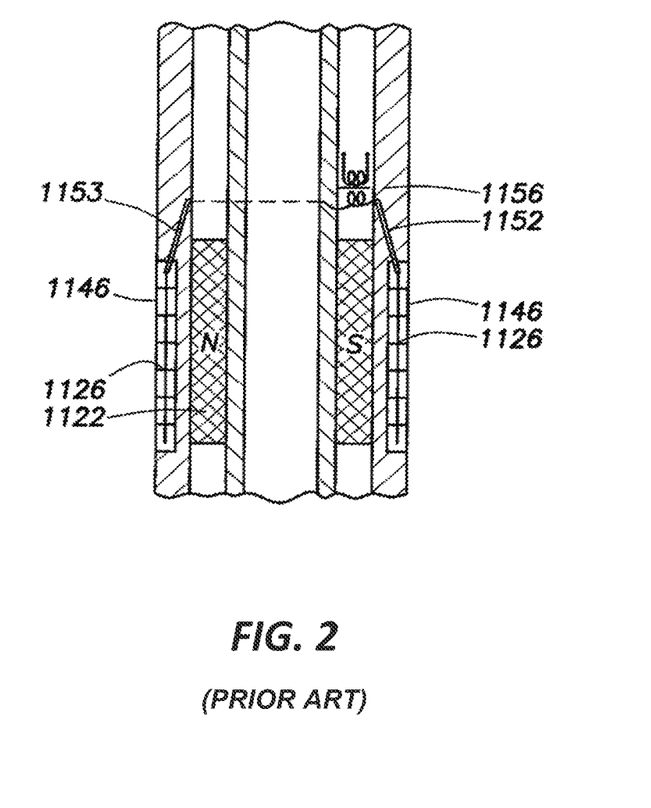
FIG. 2 shows a prior art nuclear magnetic resonance logging tool.

FIG. 2 shows an embodiment of a type of device described in commonly assigned U.S. Pat. No. 5,629,623, which is hereby incorporated by reference. While the '623 patent describes a device for formation evaluation while drilling using pulsed nuclear magnetic resonance (NMR), it is understood that other types of NMR/LWD tools can also be utilized as the LWD tool 120 or part of an LWD tool suite 120A. As described in the '623 Patent, an embodiment of one configuration of the device includes a modified drill collar having an axial groove or slot that is filled with an insulating material and contains a radio frequency (RF) antenna 1126, which is protected by a non-magnetic cover 1146 and produces and receives pulsed RF electromagnetic energy. The insulating material may include ceramic in one embodiment. In the embodiment shown, the conductors of the RF antenna are grounded at one end to the drill collar. At the other end, the conductors are coupled to an RF transformer 1156 via pressure feed-throughs 1152 and 1153. A cylindrical magnet 1122 produces a static magnetic field in the formations. The RF antenna can also be arranged so that the drill collar itself produces the oscillating RF magnetic field. The oscillating RF magnetic field, which excites nuclei of substances in the formations, is axially symmetric, to facilitate measurements during rotation of the drill string.

Although FIGS. 1 and 2 describe the use of a drilling operation and a while-drilling NMR tool, the disclosure herein can relate to any type of NMR tool, whether at the surface or downhole. Moreover, if the NMR tool is a downhole tool, the disclosure herein can apply to the downhole tool regardless of the method of conveyance, i.e., while-drilling, wireline, slickline, coiled tubing, drill pipe conveyance, wired-drill pipe, and the like.

As will be described in further detail below, the present disclosure relates to systems and methods for determining petrophysical properties from a sodium NMR log. The disclosed system and method may be used in conjunction with a computing system, such as the one described in FIG. 3.

Figure 3:
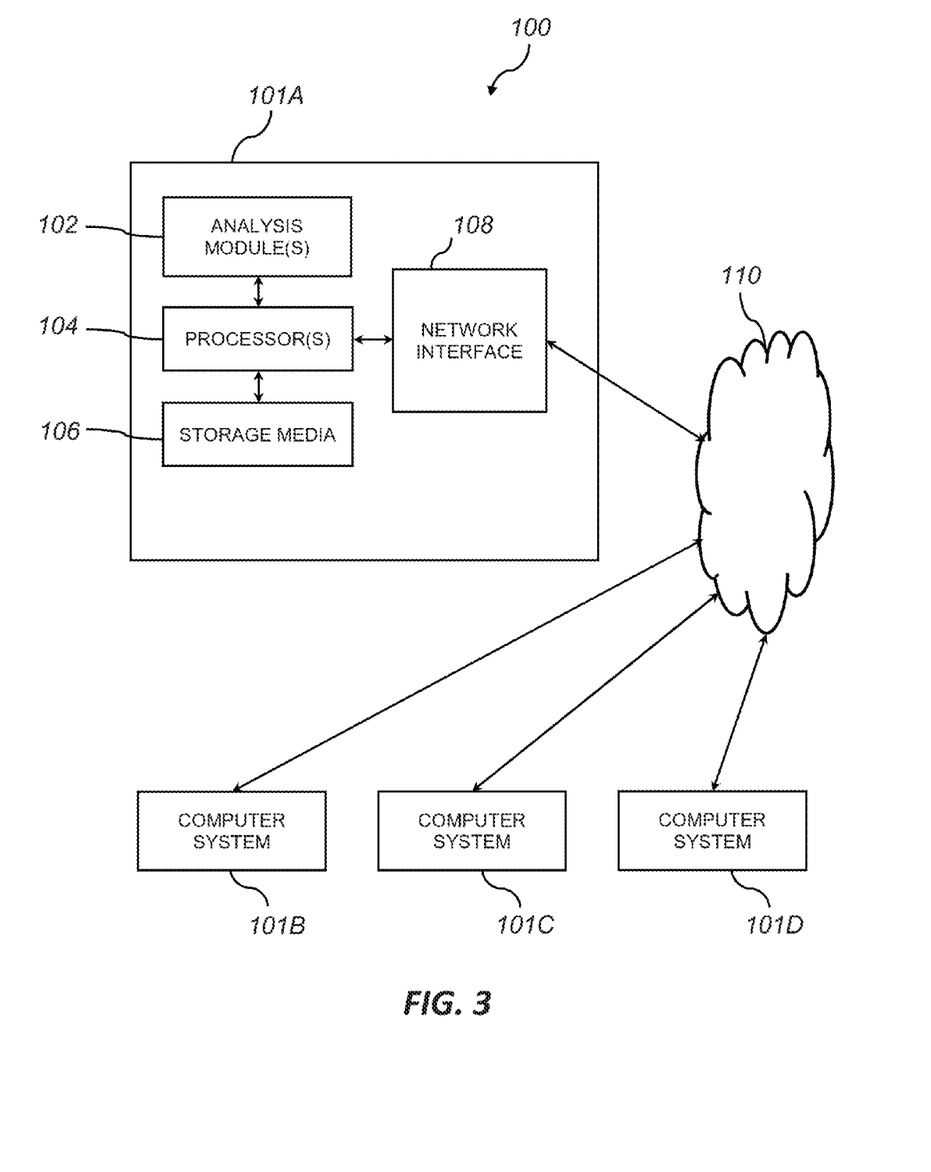
FIG. 3 illustrates an example computing system usable for one or more disclosed embodiments, in accordance with aspects of the present disclosure.

The computing system 100 shown in FIG. 3 can be an individual computer system 101A or an arrangement of distributed computer systems. The computer system 101A includes one or more analysis modules 102 that are configured to perform various tasks according to some embodiments, such as one or more methods disclosed herein (e.g., any of the steps, methods, techniques, and/or processes, and/or combinations and/or variations and/or equivalents thereof). To perform those various tasks, analysis module 102 operates independently or in coordination with one or more processors 104 that is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C, and/or 101D may or may not share the same architecture as computer system 101A, and may be located in different physical locations, e.g. computer systems 101A and 101B may be on a ship underway on the ocean, while in communication with one or more computer systems such as 101C and/or 101D that are located in one or more data centers onshore, on other ships, and/or located in various countries on different continents). It is understood that logging and control system 154 of FIG. 1 may represent the computing system 100 or one of the individual computing systems 101.

The processor(s) 104 can include a microprocessor, microcontroller, processor module or subsystem, programmable logic devices (PLDs), field-gate programmable arrays (FPGAs), application-specific integrated circuits (ASICs), system-on-a-chip processors (SoCs), or any other suitable integrated circuit capable of executing encoded instructions.

Such encoded instructions may be stored on the storage media 106, which can be implemented as one or more tangible computer-readable or machine-readable storage media. Note that while in the example embodiment of FIG. 3 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on a computer-readable or machine-readable storage medium, or can be provided on multiple computer-readable or machine-readable storage media distributed in a large system having possibly multiple nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is just one example of a computing system, and that computing system 100 may have more or fewer components than shown, may combine additional components not depicted in the example embodiment of FIG. 3, and/or computing system 100 may have a different configuration or arrangement of the components depicted in FIG. 3. For example, though not shown explicitly, computing system 100 would generally include input and output devices such as a keyboard, a mouse, a display monitor, and a printer and/or plotter. The various components shown in FIG. 3 may be implemented in hardware, software, or a combination of hardware and software elements, including one or more signal processing and/or application specific integrated circuits.

Further, the steps in the processing methods described below may be implemented by running one or more functional modules in an information processing apparatus, such as general purpose processors or application specific processors, such as ASICs, FPGAs, PLDs, or other appropriate devices. These modules, combinations of these modules, and/or their combination with general hardware are included within the scope of this disclosure.

With the foregoing in mind, both $^1$H (proton) and $^{23}$Na (sodium) nuclear magnetic resonance techniques have been used extensively in the medical and life science fields. However, the oilfield service industry has traditionally relied primarily on $^1$H NMR techniques. There are, however, many novel applications using both $^1$H and $^{23}$Na NMR logs, the $^{23}$Na NMR log alone, or the $^{23}$Na NMR log in conjunction with other logs to determine petrophysical properties of subterranean or downhole formations.

For example, $^1$H NMR may be used to derive total porosity, i.e., the sum of hydrocarbon and water, while $^{23}$Na NMR may be used to derive salt concentration. Since salt can only exist in the water phase, hydrocarbons can be inferred directly from the difference between the $^1$H NMR and $^{23}$Na NMR measurements. In addition, knowing the salt concentration allows other applications such as, but not limited to, tracking injected water, monitoring flood fronts, improving reserves estimation, and designing enhanced oil recovery (EOR) operations. For example, improving reserves estimation may be performed by performing formation evaluation when water salinity is otherwise unknown, such as in wildcat exploration wells that discovered hydrocarbons, but no water samples can be collected for salinity analysis. As further example, enhanced oil recovery may be performed when water salinity is mixed and therefore otherwise unknown.

Figure 4:
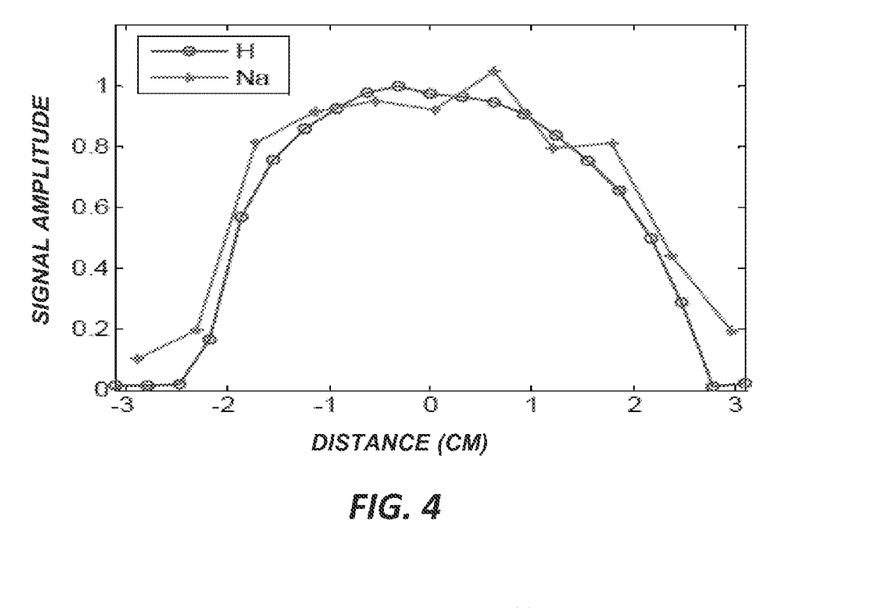
FIG. 4 is a plot showing normalized proton (hydrogen) and sodium NMR depth logs (measurements) made in a laboratory, in accordance with aspects of the present disclosure.

It has been shown in the laboratory settings that a $^{23}$Na NMR signal is measurable. FIG. 4 shows normalized $^1$H and $^{23}$Na depth logs of a 250 ppk (parts per thousand) brine solution located at center frequencies of 2 MHz ($^1$H) and 529 kHz ($^{23}$Na). Those frequencies are typical and obtainable from downhole NMR logging tools designed to detect hydrogen and sodium NMR responses.

The sodium NMR log measures the quantity of sodium in the reservoir rocks. It is convenient to express the sodium concentration in units of milligrams per liter (mg/l). If the sodium concentration is c (mg/l), the quantity of sodium measured (in mg) is c times the volume of water in liters. This can easily be expressed in moles since one mole of salt (NaCl) has a mass of 58.443 g.

A sodium NMR tool can be calibrated at the surface in a manner similar to a hydrogen NMR tool. For example, the sodium reference signal in the surface calibration might correspond to a 350,000 ppm (parts per million) (~350 g/l) brine solution at 100% porosity. The measured signal downhole could therefore be given by:

$$\frac{\text{Signal\_downhole}}{\text{Signal\_ref}} = \left(\frac{\text{Na\_downhole}}{\text{Na\_ref}}\right) \times \left(\frac{\text{Vol water\_downhole}}{\text{Vol water\_ref}}\right)$$

which may be further expressed as:

$$\text{Na\_index} = (c(\text{mg/l})/350{,}000) \times Vw \qquad (1)$$

The sodium index log thus obtained is the product of the sodium concentration (c) and the water volume (Vw) in the formation. It can be verified that Na_index=0 when there is no water (Vw=0) or no sodium (c=0). The sodium index is typically less than 1 since Vw is typically less than 100 pu (porosity units) and c is at most about 350 g/l, which corresponds to the maximum sodium solubility in water.

Figure 5:
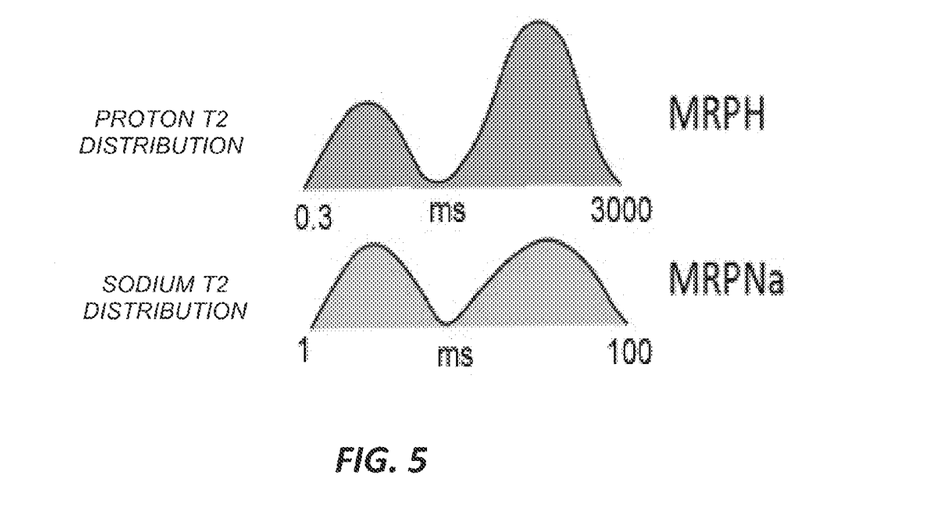
FIG. 5 is a plot showing expected proton and sodium T2 distributions with respective porosity (MRPH) and "(porosity)×(salinity)" (MRPNa), in accordance with aspects of the present disclosure.

The pore size distributions of $^1$H and $^{23}$Na in various building materials has also been measured. The results revealed a bimodal $^{23}$Na T2 distribution in mortar and calcium silicate brick. It is expected that the inversion of the sodium T2 downhole echo train will give a sodium T2 distribution analogous to the hydrogen T2 distribution. This allows differentiation between bound water and free water using the sodium T2 distribution. Combining the sodium T2 distribution with the hydrogen T2 distribution can, therefore, indicate hydrocarbon-bearing zones, as illustrated schematically in FIG. 5. In this figure, MRPH denotes the hydrogen index measured from the proton T2 distribution and MRPNa denotes the sodium index as determined using Eq. 1 and the sodium T2 distribution. (Note the T2 scales are different for the two distributions.)

In operation, a wellbore can be logged either while (e.g., LWD) or after drilling the wellbore (e.g., wireline logging). An NMR tool is used to make and record NMR measurements (logs) of the formation surrounding the wellbore at various wellbore depths. Since the $^{23}$Na log is a product of two quantities, salt concentration and water volume, there are at least two possible workflows. To determine salinity and saturation, one possible workflow uses the sodium $^{23}$Na NMR log in combination with one or more other classical "saturation" logs, while another workflow uses the $^{23}$Na NMR in conjunction with a proton $^1$H NMR log.

In one example embodiment, the $^{23}$Na NMR may be used with a resistivity log, as follows. The well-known Archie equation can be expressed as $Sw^n = Rw/(\phi^m Rt)$, where Sw represents water saturation, Rw represents formation water resistivity, Rt represents observed bulk resistivity, m represents a cementation factor, n represents a saturation exponent, and φ represents porosity. The saturation exponent n and the cementation factor m are typically close to 2 (with the cementation factor m varying somewhat depending on the type of rock in the formation, i.e., closer to 2 for limestone and dolomites, or slightly less than 2 for sandstones). Thus, a resistivity log can be solved in conjunction with Eq. 1 for salinity and saturation with m and n as input parameters. In a typical case of m=n≈2, the Archie equation becomes Vw=sqrt(Rw/Rt). Accordingly, substituting Vw into Eq. 1 will result in:

$$Na\_index = (c(mg/l)/350{,}000) \times sqrt(Rw/Rt) \qquad (2)$$

Since Rw is a function of the salinity c and the temperature, Eq. 2 can be used to derive salinity, which in turn can be used to derive the saturation from the Archie equation.

In other embodiments, a dielectric log or a capture sigma log could be used in a procedure similar to that described above to provide the second equation used to solve for both salinity and saturation in conjunction with the $^{23}$Na NMR log.

Further, in some embodiments, the $^{23}$Na NMR log can also be combined with several saturation logs such as, but not limited to, resistivity, dielectric, capture sigma, and NMR proton logs to derive salinity and saturation and other petrophysical parameters such as the Archie parameters m and n. For example, in a first step, the $^{23}$Na NMR log may be combined with the sigma log to give salinity and saturation. Then, in a second step, the Archie parameter m may be solved for using a resistivity log. As will be appreciated by those skilled in the art, adding another petrophysical parameter is a matter of providing another measurement that is sensitive to that parameter.

Workflows based on NMR $^{23}$Na and $^{1}$H logs are now described. In water-bearing zones, the proton NMR log will give Vw, and thus Eq. 1 can be used to compute salinity in those zones. A calibration factor is then computed such that the NMR $^{23}$Na and $^{1}$H logs overlay in the water-bearing zones. The calibration factor may be applied to the entire sodium log. In hydrocarbon-bearing zones, the calibrated sodium log will read less than the proton log since the proton log measures both water and hydrocarbon. The difference between the two logs represents the hydrocarbon volume.

In the case for which no water-bearing zones exist, the calibration factor may be determined in hydrocarbon zones in which there is irreducible water saturation. In these zones Vw is equal to the bound fluid volume (BFV), which can be derived from the proton NMR log via a fixed T2 cutoff or a variable T2 cutoff. Thus, Eq. 1 can be used to compute salinity in those zones. The calibration factor may be applied to the entire sodium log and the procedure described above applies.

Attention is now directed to processing procedures, methods, techniques, and workflows that are in accordance with some embodiments. Some operations in the processing procedures, methods, techniques, and workflows disclosed herein may be combined and/or the order of some operations may be changed. It will be recognized that geologic interpretations, sets of assumptions, and/or domain models such as velocity models may be refined in an iterative fashion. This concept is applicable to the processing procedures, methods, techniques, and workflows discussed herein. This iterative refinement can include use of feedback loops executed on an algorithmic basis, such as by a computing device (e.g., computing system 100, FIG. 3), and/or through manual control by a user who may make determinations regarding whether a given step, action, template, or model has become sufficiently accurate for the evaluation of the subsurface three-dimensional geologic formation under consideration.

Figure 6:
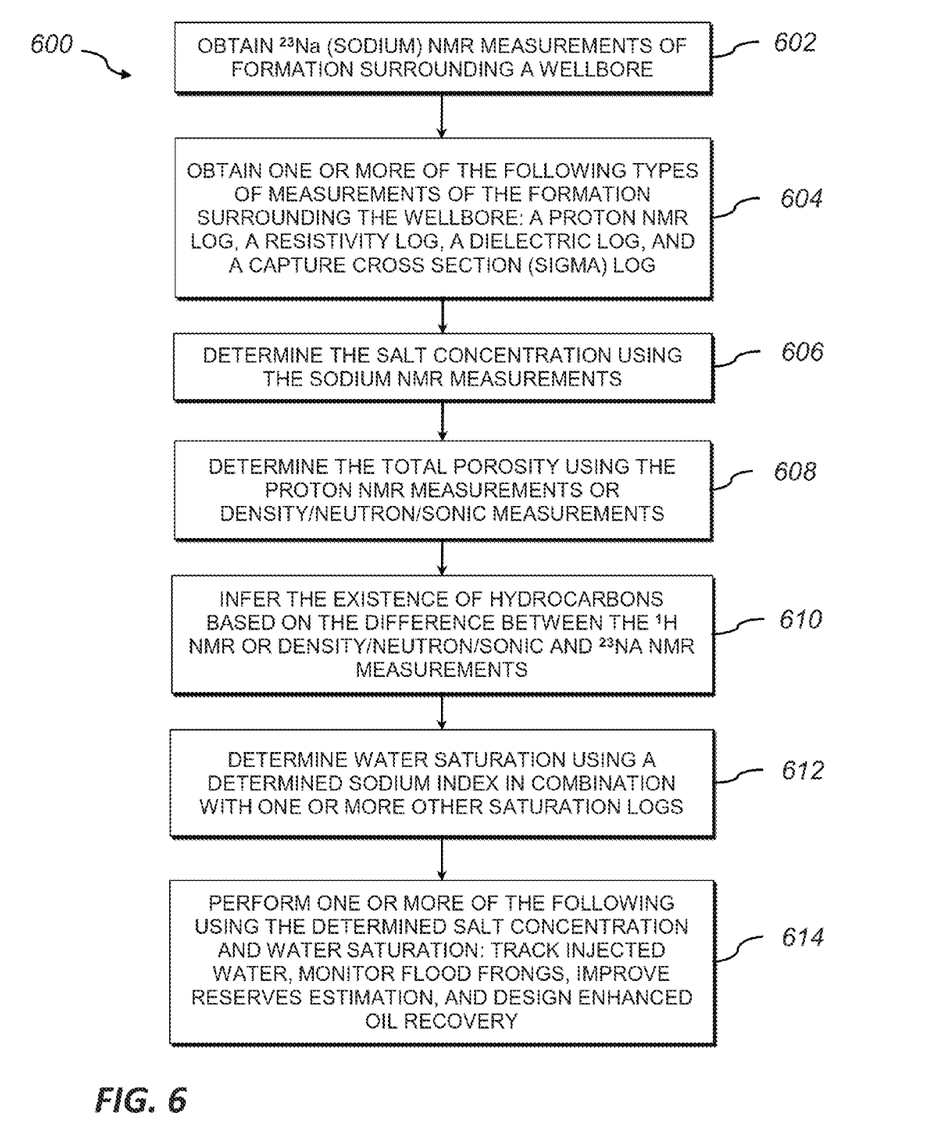
FIG. 6 is a flowchart showing possible steps for one or more embodiments, in accordance with aspects of the present disclosure.

FIG. 6 shows a flowchart illustrating an embodiment of a process 600 in accordance with the present disclosure. $^{23}$Na NMR measurements of the formation surrounding the wellbore are obtained (602). One or more of the following types of measurements of the formation surrounding the wellbore are obtained: a proton NMR log, a resistivity log, a dielectric log, and a capture cross section (sigma) log (604). The salt concentration using the sodium NMR measurements is then determined (606) and the total porosity using the proton NMR measurements is determined (608). In lieu of the proton NMR measurements, density, neutron, or sonic logs may also be used. The existence of hydrocarbons may be inferred based on the difference between the $^{1}$H NMR or other total porosity logs (e.g., density, neutron, sonic) and $^{23}$Na NMR measurements (610). Optionally, one may determine saturation using a determined sodium index in combination with one or more saturation logs (612). Optionally, one may also perform one or more of the following operations using the determined salt concentration and water saturation: tracking injected water, monitoring flood fronts, improving reserves estimation, and designing enhanced oil recovery (614).

While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

What is claimed is:

1. A method, comprising:
   determining a salt concentration of fluid in a subsurface formation using a sodium nuclear magnetic resonance (NMR) measurement obtained from the subsurface formation; and
   determining the presence of hydrocarbons in the subsurface formation fluid based on the determined salt concentration;
   determining a sodium index; and
   determining a water saturation, an oil saturation, or both the oil and water saturations of the subsurface formation using the sodium index in conjunction with one or more other logs that are sensitive to the water saturation.

2. The method of claim 1, wherein the one or more other logs are selected from the group consisting of: a resistivity log, a dielectric log, a capture cross-section (sigma) log, and a proton NMR log.

3. A computing system comprising at least one processor, at least one memory, and one or more programs stored in the at least one memory, wherein the programs comprise instructions, which when executed by the at least one processor, are configured to perform:
   obtaining a sodium nuclear magnetic resonance (NMR) measurement of a subsurface formation;
   determining a salt concentration of fluid in the subsurface formation using the sodium NMR measurement; and
   determining the presence of hydrocarbons in the subsurface formation fluid based on the determined salt concentration, wherein the at least one processor performs determining a sodium index and determining a water saturation, an oil saturation, or both the oil and water saturations of the subsurface formation using the sodium index in conjunction with one or more other logs that are sensitive to the water saturation.

4. The computing system of claim 3, wherein the one or more other logs are selected from the group consisting of: a resistivity log, a dielectric log, a capture cross section (sigma) log, and a proton NMR log.

5. A non-transitory, computer-readable storage medium comprises instructions, which when executed by a processor, cause the processor to perform a method comprising:
    obtaining a sodium nuclear magnetic resonance (NMR) measurement of a subsurface formation;
    determining a salt concentration of fluid in the subsurface formation using the sodium NMR measurement; and
    determining the presence of hydrocarbons in the fluid based on the determined salt concentration, wherein the instructions cause the processor to:
    determine a sodium index;
    determine a water saturation, an oil saturation, or both the oil and water saturations of the subsurface formation; and
    use the sodium index in conjunction with one or more other logs that are sensitive to the water saturation.

* * * * *